United States Patent [19]

Cheng

[11] Patent Number: 5,077,133

[45] Date of Patent: Dec. 31, 1991

[54] INFRARED AND ULTRAVIOLET RADIATION ABSORBING GREEN GLASS COMPOSITION

[75] Inventor: J. Joseph Cheng, Perrysburg, Ohio

[73] Assignee: Libbey-Owens-Ford Co., Toledo, Ohio

[21] Appl. No.: 575,127

[22] Filed: Aug. 30, 1990

Related U.S. Application Data

[63] Continuation-in-part of Ser. No. 542,207, Jun. 21, 1990, abandoned, which is a continuation-in-part of Ser. No. 438,538, Nov. 16, 1989, abandoned.

[51] Int. Cl.$^5$ ............... C03C 3/087; C03C 3/095; C03C 4/08; C03C 4/10
[52] U.S. Cl. ............... 428/426; 501/64; 501/70; 501/904; 501/905; 296/84.1
[58] Field of Search ............... 501/64, 70, 905, 904; 428/426; 296/84.1

[56] References Cited

U.S. PATENT DOCUMENTS 4,704,425 10/1987 Baker et al. ............... 501/70
4,792,536 12/1988 Pecoraro ............... 501/70

Primary Examiner—Mark L. Bell
Attorney, Agent, or Firm—Marshall & Melhorn

[57] ABSTRACT

Green-colored, infrared energy and ultraviolet radiation absorbing glass compositions comprise conventional soda-lime-silica float glass ingredients, a high concentration of moderately reduced iron, and ceric oxide. The resultant glass exhibits an Illuminant A visible light transmittance greater than 70%, a total solar energy transmittance less than about 46%, and an ultraviolet radiation transmittance less than about 38%, at glass thicknesses in the range of 3 mm to 5 mm. Optionally, a portion of the ceric oxide can be replaced with a predetermined quantity of titanium oxide.

33 Claims, No Drawings

INFRARED AND ULTRAVIOLET RADIATION ABSORBING GREEN GLASS COMPOSITION

This application is a continuation in part of U.S. application Ser. No. 07/542,207, filed June 21, 1990, now abandoned, which in turn is a continuation-in-part of U.S. application Ser. No. 07/438,538, filed Nov. 16, 1989, now abandoned.

FIELD OF THE INVENTION

The present invention relates generally to infrared and ultraviolet radiation absorbing green glass compositions, and more specifically to green glass compositions having a particular combination of energy absorption and light transmittance properties. The preferred glass has a narrowly defined dominant wavelength and color purity. The present invention is particularly useful for producing automotive and architectural glazings, wherein high visible light transmittances and low total solar energy and ultraviolet radiation transmittances are desired.

BACKGROUND OF THE INVENTION

It is generally known to manufacture infrared radiation absorbing soda-lime-silica glass by the incorporation therein of iron. The iron is generally present in the glass as both ferrous oxide (FeO) and ferric oxide ($Fe_2O_3$). The balance between ferrous and ferric oxide has a direct and material effect on the color and transmittance properties of the glass. As the ferrous oxide content is increased (as a result of chemically reducing ferric oxide), the infrared absorption increases and the ultraviolet absorption decreases. The shift toward a higher concentration of FeO in relation to the $Fe_2O_3$ also causes a change in the color of the glass from a yellow or yellow-green to a darker green or blue-green, which reduces the visible transmittance of the glass. Therefore, in order to obtain greater infrared absorption in glass without sacrificing visual transmittance, it has been deemed necessary in the prior art to produce glass with a low total iron content which is highly reduced from $Fe_2O_3$ to FeO. A low total iron content glass is generally regarded as one produced from a batch composition having less than about 0.70 to 0.75% by weight iron calculated as $Fe_2O_3$. As an example, U.S. Pat. No. 3,652,303 discloses an infrared absorbing blue soda-lime-silica glass composition, having a visible light transmittance greater than 70% at one quarter inch thickness, wherein at least 80% of the total iron in the glass is maintained in the ferrous state by the inclusion of a reducing quantity of tin metal or stannous chloride in the melt.

Many glass compositions additionally contain cerium for the purpose of providing ultraviolet absorption. For example, U.S. Pat. No. 1,414,715 discloses the addition of 3% to 6% by weight of ceric oxide to prepare a non-iron-containing glass composition having a flesh tint. The patent additionally teaches that ceric oxide reduces the visible light transmittance of the glass.

U.S. Pat. No. 1,637,439 discloses the use of 5% to 10% by weight of ceric oxide as an ultraviolet absorber in dark blue glass compositions. The glass, which is useful for example for observing the operation of an open-hearth furnace, is made dark blue by the addition of 0.1% to 0.5% by weight of cobalt oxide. The high concentration of ceric oxide absorbs virtually all of the ultraviolet radiation which would otherwise pass through the eye protecting glass. Clearly, such a glass composition has a low visible light transmittance, and would not be useful for automotive or architectural glazings.

U.S. Pat. No. 1,936,231 discloses a colorless glass, wherein ferric oxide is added as an ultraviolet cut-off agent in quantities so small that the resultant glass retains its high visible light transmittance. The suggested total iron content is approximately 0.35% by weight. The patent further discloses that cerium compounds may be added, as ultraviolet radiation cut-off agents, to low total iron containing glass compositions. Thus, the resultant glass compositions retain their colorless appearance and high visible light transmittance properties.

U.S. Pat. No. 2,524,719 discloses a rose colored glass composition, wherein iron is added to the glass batch as an infrared energy absorber, and selenium is added as an ultraviolet radiation absorber. It is suggested that ceric oxide may be included, at an amount in excess of 3% by weight, to assist the selenium in the absorption of ultraviolet radiation.

U.S. Pat. No. 2,860,059 discloses an ultraviolet absorbing glass composition, having a low total iron concentration, which is described as superior in visible light transmittance to the greenish-blue glasses generally used in automotive and architectural glazings. The maximum iron content is 0.6% by weight, in order for the glass to maintain its colorless appearance and high visible light transmittance. Titanium dioxide, and up to 0.5% by weight ceric oxide, are added to the glass for the purpose of providing ultraviolet radiation absorption.

U.S. Pat. No. 2,444,976 discloses a golden color glass particularly adapted for glazing aircraft having an exceptionally low transmittance in the ultraviolet and a high transmittance in the visible. The glass contains iron oxide as a heat absorbing component together with large amounts of both cerium oxide (1.5% to 3%) and titanium oxide (6% to 9%).

Finally, U.S. Pat. No. 4,792,536 discloses a process for producing an infrared energy absorbing glass, containing a low total iron concentration which is highly reduced to FeO. It is further disclosed that the infrared energy absorption can be increased by including greater amounts of total iron in the glass composition, but states that the visible light transmittance would thereby be reduced below levels considered adequate for automotive glazings. The disclosed process utilizes a two stage melting and refining operation, which provides highly reducing conditions so as to increase the amount of iron in the ferrous state for a given low total iron concentration of from 0.45% to 0.65% by weight. The patent teaches that the iron must be at least 35% reduced to FeO. Most preferably, greater than 50% of the total iron content must be reduced to the ferrous state. It is further disclosed that 0.25% to 0.5% by weight of ceric oxide may be added to low total concentration, highly reduced iron containing glass compositions, for the purpose of absorbing ultraviolet radiation. It is disclosed that higher concentrations of ceric oxide are to be avoided, as they would compromise the overall transmittance properties of the glass. As an example of the glass which may be produced by the process taught in U.S. Pat. No. 4,792,536. Composition No. 11 discloses a low total iron containing glass, which is 30% reduced to FeO, and contains 1% ceric oxide. At a thickness of 4 mm, the total solar energy transmittance is about 52%, and the ultraviolet radiation transmittance is about 37%. The relatively high total solar energy transmittance value results from the low total iron concentration, while the relatively high ultraviolet radiation transmittance value is caused by the low concentration of $Fe_2O_3$, a large portion of which has been reduced to FeO.

It would be desirable to produce a green-colored glass, utilizing conventional float glass technology, for use in automotive and architectural glazings, having a high Illuminant A visible light transmittance of at least 70%, a low total solar energy transmittance of less than about 46%, and a low ultraviolet radiation transmittance of less than about 38%, at nominal glass thicknesses in the range of 3 mm to 5 mm*. A green glass composition having these outstanding transmittance properties can not be produced utilizing the low total concentration, highly reduced iron containing glass compositions employing ceric oxide as disclosed in the prior art. Moreover, the use of a high total iron containing glass for this purpose is contrary to the teachings of the prior art.

*It should be understood that by this recitation of glass thickness is meant total glass thickness, and the glazing unit comprising same may be composed of a single glass sheet or two or more glass sheets, the total thickness of which is in the indicated range.

It must be noted that the prior art referred to hereinabove has been collected and examined only in light of the present invention as a guide. It is not to be inferred that such diverse art would otherwise be assembled absent the motivation provided by the present invention.

SUMMARY OF THE INVENTION

In accordance with the present invention, a green glass composition, having an Illuminant A visible light transmittance value of at least 70%, a total solar energy transmittance less than about 46%, and an ultraviolet radiation transmittance less than about 38% and preferably not greater than approximately 34%, at nominal glass thicknesses of 3 to 5 mm, has surprisingly been discovered.* The composition comprises a soda-lime-silica glass including as essential ingredients from about 0.51 to about 0.96 weight percent $Fe_2O_3$, from about 0.15 to about 0.33 weight percent FeO, and from about 0.2 to about 1.4 weight percent $CeO_2$. Alternatively, the amount of $CeO_2$ may be reduced by the inclusion of from about 0.02 to about 0.85 weight percent $TiO_2$. Percentages of $TiO_2$ below about 0.02 weight percent are normally present as trace amounts in soda-lime-silica glasses. These glasses have an Illuminant C dominant wavelength from about 498 to about 525 nanometers, preferably from 498 to 519 nanometers, and a color purity from about 2% to about 4% preferably from about 2% to about 3%. They are produced from batch compositions having a total iron concentration, expressed as $Fe_2O_3$, above about 0.7%.

*Radiation transmittance results are based upon the following wavelength ranges:
Ultraviolet: 300–400 nanometers
Visible: 400–770 nanometers
Total Solar: 300–2130 nanometers **It is common in the glass industry to refer to the total iron contained in a glass composition or batch as "total iron expressed as $Fe_2O_3$". When a glass batch is melted, however, some of this amount of total iron is reduced to FeO, while the rest remains $Fe_2O_3$. For this reason, it shall be understood that by "$Fe_2O_3$", as used herein and in the appended claims, is meant weight percent ferric oxide in the glass composition after reduction. By "total iron expressed as $Fe_2O_3$" is meant the total weight of iron contained in the glass batch before reduction. Further, when reduced to FeO, $Fe_2O_3$ will produce not only FeO, but oxygen gas. This loss of oxygen will decrease the combined weight of the two iron compounds. Therefore, the combined weight of FeO and $Fe_2O_3$ contained in a resulting glass composition will be less than the batch weight of the total iron expressed as $Fe_2O_3$.

The glass compositions of the present invention are particularly suited for the production of infrared energy and ultraviolet radiation absorbing green glass, for automotive and architectural glazings. Thus, glass sheets of this composition may be heat strengthened or tempered, or alternately annealed and laminated together through an interposed transparent resinous layer, for example composed of polyvinyl butyral, and employed, for example, as a windshield. Generally, the glass sheets for windshield use are of a thickness in the range of from about 1.7 mm to about 2.5 mm, while those tempered and used as sidelights or backlights are in the range of about 3 mm to about 5 mm thick.

Unless otherwise noted, the term percent (%) as used herein and in the appended claims, means percent (%) by weight. Wavelength dispersive X-ray fluorescence was used to determine the weight percents of $CeO_2$, $TiO_2$, and total iron expressed as $Fe_2O_3$. Percent reduction of total iron was determined by first measuring the radiant transmission of a sample at a wavelength of 1060 nanometers, using a spectrophotometer. The 1060 nm transmission value was then used to calculate optical density, using the following formula:

$$\text{Optical density} = \text{Log}_{10}\frac{100}{T} \quad (T = \text{transmission at 1060 nm}).$$

The optical density was then used to calculate the percent reduction:

$$\text{percent reduction} = \frac{(110) \times (\text{optical density})}{(\text{Glass thickness in mm}) \times (\text{wt \% total Fe}_2\text{O}_3)}$$

DETAILED DESCRIPTION OF THE PREFERRED EMBODIMENT

For use as an automotive windshield, infrared energy and ultraviolet radiation absorbing glass must meet federal specifications which require an Illuminant A visible light transmittance greater than 70%. The thinner glasses used in modern automobiles have made it easier to achieve the 70% Illuminant A standard, but have also resulted in increased infrared energy and ultraviolet radiation transmittances. Consequently, automobile manufacturers have been forced to compensate for greater heat loads by appropriately sizing air conditioning equipment, and are compelled to include more ultraviolet radiation stabilizers in fabrics and interior The green glass compositions of the present invention, when fabricated to a total glass thickness of about 3 mm to 5 mm, can exhibit an Illuminant A visible light transmittance value of at least 70%, and provide combined infrared energy and ultraviolet radiation transmittance values substantially lower than the compositions disclosed in the prior art. The total solar energy transmittance of the compositions of the present invention, at selected glass thicknesses in the range of 3 mm to 5 mm, is less than about 46%. Preferably, the total solar energy transmittance in these thicknesses is less than about 45%. Total solar energy transmittance is a measure of the solar energy transmittance over all solar energy wavelengths. It is an integrated term covering the area under the transmittance versus wavelength curve for visible, infrared and ultraviolet energy wavelengths. The ultraviolet radiation transmittance of the compositions of the present invention is less than about 38%, at selected glass thicknesses in the range of 3 mm to 5 mm, and generally not more than about 34%. The ultraviolet radiation transmittance value is an integrated term representing the area under the transmittance versus wavelength curve for wavelengths between 300 and 400 nanometers.

Suitable batch materials according to the present invention, which are compounded by conventional glass batch ingredient mixing devices, include sand, limestone, dolomite, soda ash, salt cake or gypsum, rouge, carbon, and a cerium compound such as ceric oxide or cerium carbonate, and optionally a titanium compound such as titanium dioxide. These materials are conveniently melted together in a conventional glass making furnace, to form a green-colored infrared energy and ultraviolet radiation absorbing glass composition, which thereafter may be continuously cast onto the molten metal bath in a float glass process. The flat glass thus produced may be formed into architectural glazings, or cut and formed, such as for example by press bending, into automotive glazings.

The composition of the resultant soda-lime silica glass comprises:

A) from about 65 to about 75 weight percent $SiO_2$;
B) from about 10 to about 15 weight percent $Na_2O$;
C) from 0 to about 4 weight percent $K_2O$;
D) from about 1 to about 5 weight percent MgO;
E) from about 5 to about 15 weight percent CaO;
F) from 0 to about 3 weight percent $Al_2O_3$;
G) from about 0.53 to about 0.96 weight percent $Fe_2O_3$;
H) from about 0.15 to about 0.33 weight percent FeO; and
I) from about 0.2 to about 1.4 weight percent $CeO_2$.

Preferably, the resultant glass composition consists essentially of:

A) from about 70 to about 73 weight percent $SiO_2$;
B) from about 12 to about 14 weight percent $Na_2O$;
C) from 0 to about 1 weight percent $K_2O$;
D) from about 3 to about 4 weight percent MgO;
E) from about 6 to about 10 weight percent CaO;
F) from 0 to about 2 weight percent $Al_2O_3$;
G) from about 0.53 to about 0.96 weight percent $Fe_2O_3$;
H) from about 0.15 to about 0.33 weight percent FeO; and
I) from about 0.2 to about 1.4 weight percent $CeO_2$.

Alternatively, the quantity of ceric oxide in the glass may be reduced by the inclusion therein of titanium dioxide. In order to maintain the desired ranges of transmittance, dominant wavelength, and color purity described hereinabove, when substituting titanium dioxide for ceric oxide in the glass, the weight percent of total iron expressed as $Fe_2O_3$ must be reduced, and the percent reduction to FeO must be increased. This results in a glass comprising:

A) from about 65 to about 75 weight percent $SiO_2$;
B) from about 10 to about 15 weight percent $Na_2O$;
C) from 0 to about 4 weight percent $K_2O$;
D) from about 1 to about 5 weight percent MgO;
E) from about 5 to about 15 weight percent CaO;
F) from 0 to about 3 weight percent $Al_2O_3$;
G) from about 0.5 to about 0.9 weight percent $Fe_2O_3$;
H) from about 0.15 to about 0.33 weight percent FeO;
I) from about 0.1 to about 1.36 weight percent $CeO_2$; and
J) from about 0.02 to about 0.85 weight percent $TiO_2$.

It shall be noted that, at low quantities of $TiO_2$ inclusion, each weight percent of $TiO_2$ must replace two weight percent of $CeO_2$ to maintain the glass properties described hereinabove. As the level of $TiO_2$ increases, however, the effect of $TiO_2$ addition lessens slightly. For example, a composition initially containing 1.0 weight percent $CeO_2$ and no added $TiO_2$ will require about 0.3 weight percent $TiO_2$ to replace about 0.5 weight percent $CeO_2$ and still maintain glass properties (thus at higher quantities of $TiO_2$ substitution, each weight percent $TiO_2$ will replace about 1.5 weight percent $CeO_2$). Preferably, the glass composition employing titanium dioxide consists essentially of:

A) from about 70 to about 73 weight percent $SiO_2$;
B) from about 12 to about 14 weight percent $Na_2O$;
C) from 0 to about 1 weight percent $K_2O$;
D) from about 3 to about 4 weight percent MgO;
E) from about 6 to about 10 weight percent CaO;
F) from 0 to about 2 weight percent $Al_2O_3$;
G) from about 0.5 to about 0.9 weight percent $Fe_2O_3$;
H) from about 0.15 to about 0.33 weight percent FeO;
I) from about 0.1 to about 1.36 weight percent $CeO_2$; and
J) from about 0.02 to about 0.85 weight percent $TiO_2$.

Silica forms the glass matrix. Sodium oxide, potassium oxide, magnesium oxide, and calcium oxide act as fluxes to reduce the melting temperature of the glass. Alumina regulates the viscosity of the glass, and prevents divitrification. Moreover, the magnesium oxide, calcium oxide, and alumina act together to improve the durability of the glass. Salt cake or gypsum acts as a refining agent, while carbon is a known reducing agent.

Iron is added, typically as $Fe_2O_3$, and is partially reduced to FeO. The total amount of iron in the batch is critical, and must equal from 0.7% to about 1.25% by weight, expressed as $Fe_2O_3$. Likewise, the degree of reduction is critical and must equal between 23% and 29%. The aforementioned critical ranges, for total iron and the degree of reduction from ferric to ferrous iron, result in concentrations from about 0.53 to about 0.96 weight percent $Fe_2O_3$ and from about 0.15 to about 0.33 weight percent FeO in the glass. If the iron is more highly reduced than the critical amount, the glass will become too dark and the Illuminant A visible light transmittance will drop below 70%. Additionally, the glass batch melting process will become increasingly difficult as the increased amount of FeO prevents the penetration of heat to the interior of the melt. If the iron is less reduced than the critical amount, or if a lower total amount of iron is employed, then the total solar energy transmittance for a desired thickness glass can rise above about 46%. Finally, if an amount of total iron higher than the critical amount is used, less heat will be able to penetrate the interior of the melt, and the batch melting process will become increasingly more difficult. Clearly, the high total iron concentration, and low reduction to FeO, are critical to the performance of the glass, and contrary to the teachings of that prior art directed to glass compositions having a high visible light transmittance and low infrared energy and ultraviolet radiation transmittances.

Moreover, the concentration of the ceric oxide ultraviolet radiation absorber, in concert with the iron, is critical to the balance of transmittance properties. The ceric oxide must be present at a concentration from about 0.2% to about 1.4% by weight. A higher concentration of ceric oxide would absorb more radiation in the 400 to 450 nanometers wavelength range, causing the color of the glass to change from green to yellow-green. A lower concentration of ceric oxide would cause the ultraviolet radiation transmittance to rise above about 38%. A combination of from about 0.1 to about 1.36 weight percent $CeO_2$ and from about 0.02 to about 0.85 weight percent $TiO_2$ may be substituted for the aforementioned amount of from about 0.2 to about 1.4 weight percent of ceric oxide alone. The combination of ceric oxide and titanium dioxide have the same operability and utility as the greater required amount of ceric oxide alone, and deviations above or below the stated maximums and minimums for these ingredients will detrimentally affect the absorbence and color properties of the glass as recited hereinabove for ceric oxide alone.

As can be seen, the synergistic effect of the critical concentration limits for the iron and ceric oxide, and the critical limitation for the degree of reduction of $Fe_2O_3$ to FeO, is to produce a green glass composition having an Illuminant A visible light transmittance greater than 70%, a total solar energy transmittance less than about 46%, and an ultraviolet radiation transmittance of less than about 38%, preferably less than about 34%.

Moreover, the green glass of the present invention is characterized by an Illuminant C dominant wavelength from about 498 to about 525 nanometers, and displays a color purity from about 2% to about 4%. The purity of an automotive vision glazing is an important parameter, and should be maintained at as low a level as practicable. Blue glass, by comparison, has a purity of up to about 10%, and therefore is less desirable as an automotive vision glazing.

As hereinbefore indicated, the invention particularly contemplates and concerns glazings of glass thicknesses in the range of 3 mm to 5 mm. Examples of soda-lime silica compositions in accordance with the invention at specific thicknesses in this range are set forth below. All of these glasses have Illuminant A visible light transmittances equal to or greater than 70%, a total solar energy transmittance less than about 46%, and an ultraviolet radiation transmittance less than about 36%.

TABLE I

| Total Weight % in Glass | 3 mm | 4 mm | 5 mm |
| --- | --- | --- | --- |
| $Fe_2O_3$ | .71 to .95 | .54 to .65 | .51 to .59 |
| FeO | .26 to .32 | .18 to .22 | .14 to .17 |
| $CeO_2$ | 0.8 to 1.4 | .55 to 1.2 | 0.2 to 0.7 |
| % Reduction | 23 to 29 | 23 to 29 | 23 to 29 |

TABLE II

| Total Weight % in Glass | 3 mm | 4 mm | 5 mm |
| --- | --- | --- | --- |
| $Fe_2O_3$ | 0.68 to 0.92 | .51 to .62 | .48 to .56 |
| FeO | 0.26 to 0.32 | .18 to .22 | .14 to .17 |
| $CeO_2$ | .5 to 1.2 | .3 to .75 | .1 to .4 |
| $TiO_2$ | .02 to .85 | .02 to .45 | .02 to .35 |
| % Reduction | 23 to 29 | 23 to 29 | 23 to 29 |

EXAMPLES 1-15

Typical soda-lime-silica glass batch ingredients were mixed, together with rouge, a cerium compound, a carbonaceous reducing agent, and optionally a titanium compound, and melted to produce 4 mm thick test samples in accordance with the invention. The resultant glass samples are characterized as follows:

TABLE III

| Glass Properties at 4 mm | | | | | | |
| --- | --- | --- | --- | --- | --- | --- |
| | Ex. 1 | Ex. 2 | Ex. 3 | Ex. 4 | Ex. 5 | Ex. 6 |
| Total Iron, as $Fe_2O_3$ (%) | .782 | .789 | .783 | .788 | .788 | .784 |
| Reduction of Iron to FeO (%) | 25.1 | 25.7 | 26.2 | 27.3 | 27.5 | 27.7 |
| $Fe_2O_3$ (%) | .586 | .586 | .578 | .573 | .571 | .567 |
| FeO (%) | .177 | .182 | .185 | .194 | .195 | .195 |
| $CeO_2$ (%) | .913 | .909 | .915 | .914 | .913 | .911 |
| $TiO_2$ (%) | 0 | 0 | 0 | 0 | 0 | 0 |
| Illuminant A (%) Transmittance | 72.8 | 72.3 | 72.2 | 71.2 | 71.5 | 71.6 |
| Total Solar Transmittance (%) | 45.9 | 45.1 | 44.8 | 43.9 | 43.7 | 43.6 |
| UV Transmittance (%) | 33.0 | 33.2 | 33.3 | 33.5 | 33.5 | 33.6 |
| Dominant Wavelength (nm) | 512.8 | 509.2 | 508.2 | 505.2 | 504.5 | 504.6 |
| Color Purity (%) | 2.4 | 2.4 | 2.5 | 2.8 | 2.9 | 2.9 |

| | Ex. 7 | Ex. 8 | Ex. 9 | Ex. 10 | Ex. 11 | Ex. 12 |
| --- | --- | --- | --- | --- | --- | --- |
| Total Iron, as $Fe_2O_3$ (%) | .78 | .78 | .84 | .81 | .833 | .813 |
| Reduction of Iron to FeO (%) | 27.4 | 27.0 | 25.8 | 26.7 | 26.5 | 26.7 |
| $Fe_2O_3$ (%) | .566 | .569 | .623 | .594 | .612 | .596 |
| FeO (%) | .192 | .190 | .195 | .195 | .199 | .195 |
| $CeO_2$ (%) | .6 | .6 | .91 | .56 | .915 | .563 |
| $TiO_2$ (%) | .2 | .2 | 0 | .25 | .021 | .253 |
| Illuminant A (%) Transmittance | 70.4 | 70.2 | 71.5 | 71.7 | 71.3 | 71.7 |
| Total Solar Transmittance (%) | 42.9 | 43.1 | 43.7 | 43.8 | 43.5 | 43.8 |
| UV Transmittance (%) | 30.7 | 30.1 | 33.2 | 33.1 | 33.4 | 33.1 |
| Dominant Wavelength (nm) | 507.9 | 507.6 | 506.5 | 514.1 | 505.8 | 514.1 |
| Color Purity (%) | 2.8 | 2.9 | 2.6 | 2.5 | 2.8 | 2.5 |

| | Ex. 13 | Ex. 14 | Ex. 15 |
| --- | --- | --- | --- |
| Total Iron, as $Fe_2O_3$ (%) | .74 | .74 | .85 |
| Reduction of Iron to FeO (%) | 24.8 | 28.8 | 16.4 |
| $Fe_2O_3$ (%) | .556 | .527 | .711 |
| FeO (%) | .165 | .192 | .125 |
| $CeO_2$ (%) | .5 | .5 | .7 |
| $TiO_2$ (%) | 0 | 0 | 0 |
| Illuminant A (%) Transmittance | 74.2 | 72 | 74.9 |
| Total Solar Transmittance (%) | 47.8 | 44.3 | 51.2 |
| UV Transmittance (%) | 39.4 | 40.1 | 28.9 |
| Dominant Wavelength (nm) | 498.6 | 495.7 | 550.8 |
| Color | 3.3 | 4.4 | 4.1 |

TABLE III-continued

Glass Properties at 4 mm

Purity (%)

The complete compositions of the glasses of Exs. 11 and 12 are as follows:

|  | Ex. 11 | Ex. 12 |
|---|---|---|
| $SiO_2$ | 71.58 | 71.64 |
| $Na_2O$ | 13.75 | 13.97 |
| CaO | 8.42 | 8.38 |
| MgO | 4.14 | 3.97 |
| $Fe_2O_3$ | .833 | .813 |
| $TiO_2$ | .021 | .253 |
| $Al_2O_3$ | .12 | .16 |
| $SO_3$ | .13 | .14 |
| $K_2O$ | 0 | .02 |
| $Cr_2O_3$ | .0002 | .0003 |
| $CeO_2$ | .915 | .563 |
| $La_2O_3$ | .008 | .006 |

| | Predictive Examples 16-21 | | | | | |
|---|---|---|---|---|---|---|
| | Ex. 16 | Ex. 17 | Ex. 18 | Ex. 19 | Ex. 20 | Ex. 21 |
| Total Iron, as $Fe_2O_3$ (%) | .76 | .74 | .74 | .86 | .86 | .88 |
| Reduction of Iron to FeO (%) | 23 | 24 | 23 | 25 | 27 | 26 |
| $Fe_2O_3$ (%) | .585 | .562 | .570 | .645 | .628 | .651 |
| FeO (%) | .157 | .160 | .153 | .194 | .209 | .205 |
| $CeO_2$ (%) | .2 | .3 | .4 | .5 | .6 | .7 |
| $TiO_2$ (%) | 0 | 0 | 0 | 0 | 0 | 0 |
| Illuminant A (%) Transmittance | 70.6 | 70.6 | 71.2 | 71.1 | 70.0 | 70.1 |
| Total Solar Transmittance (%) | 42.4 | 42.5 | 43.3 | 42.7 | 41.2 | 41.1 |
| UV Transmittance (%) | 35.2 | 35.3 | 34.1 | 34.4 | 35.1 | 32.0 |
| Thickness (mm) | 5 | 5 | 5 | 4 | 4 | 4 |

An automotive windshield in accordance with the invention, comprising two sheets of a green glass composition, namely, 71.73% $SiO_2$, 13.78% $Na_2O$, 8.64% CaO, 4.00% MgO, 0.776% total iron expressed as $Fe_2O_3$ (which is 24.3% reduced to FeO), trace (0.017%) $TiO_2$, 0.12% $Al_2O_3$, 0.14% $SO_3$, 0.0003% $Cr_2O_3$, 0.89% $CeO_2$, and 0.09% $La_2O_3$, each sheet having a nominal thickness of 2.2 mm, with an interposed polyvinyl butyral interlayer of nominal 0.030 inch thickness, has the following properties: Illuminate A tranmittance=71.4%, total solar transmittance=43.0%, UV transmittance=16.3%, dominant wavelength=518.6 nm, and color purity=2.5%.

A similar automotive windshield in accordance with the invention, consisting of two sheets of a green glass composition including 0.834% total iron expressed as $Fe_2O_3$ (which is 26.8% reduced to FeO), trace (.016%) TiO2, and 913% $CeO_2$, each sheet having a nominal thickness of 1.8 mm, with an interposed polyvinyl butyral interlayer of nominal 030 thickness, has the following properties: Illuminate A transmittance=72.2%, total solar transmittance=44.1%, UV transmittance=17.1%, dominant wavelength=511 nm, and color purity=2.4%.

What is claimed is:

1. A green-colored, infrared energy and ultraviolet radiation absorbing soda-lime-silica glass including as essential ingredients from about 0.51 to about 0.96 weight percent $Fe_2O_3$, from about 0.15 to about 0.33 weight percent FeO, and from about 0.2 to about 1.4 weight percent $CeO_2$, wherein said weight percent FeO represents a percent reduction of total iron, expressed as $Fe_2O_3$, of from about 23% to about 29%, said glass having an Illuminant C dominant wavelength of from about 498 to about 525 nanometers, and a color purity of from about 2% to about 4%.

2. A green-colored glass as defined in claim 1, wherein said glass at a thickness in the range of from about 3 mm to about 5 mm has an Illuminant A visible light transmittance greater than 70%, a total solar energy transmittance less than about 46%, and an ultraviolet radiation transmittance less than about 38%.

3. A green-colored glass as defined in claim 2, wherein the Illuminant C dominant wavelength is from about 498 to about 519 nanometers, the color purity is from about 2% to about 3%, the total solar energy transmittance is less than about 45%, and the ultraviolet radiation transmittance is not greater than approximately 34%.

4. A green-colored, infrared energy and ultraviolet radiation absorbing soda-lime-silica glass including as essential ingredients from about 0.48 to about 0.92 weight percent $Fe_2O_3$, from about 0.15 to about 0.33 weight percent FeO, and from about 0.1 to about 1.36 weight percent $CeO_2$, and from about 0.02 to about 0.85 weight percent $TiO_2$, wherein said weight percent FeO represents a percent reduction of total iron, expressed as $Fe_2O_3$, of from about 23% to about 29%, said glass having an Illuminant C dominant wavelength of from about 498 to about 525 nanometers, and a color purity of from about 2% to about 4%.

5. A green-colored glass as defined in claim 4, wherein said glass at a thickness in the range of from about 3 mm to about 5 mm has an Illuminant A visible light transmittance greater than 70%, a total solar energy transmittance less than about 46%, and an ultraviolet radiation transmittance less than about 38%.

6. A green-colored glass as defined in claim 5, wherein the Illuminant C dominant wavelength is from about 498 to about 519 nanometers, the color purity is from about 2% to approximately 3%, the total solar energy transmittance is than about 45%, and the ultraviolet radiation transmittance is less than about 34%.

7. A green-colored, infrared energy and ultraviolet radiation absorbing soda-lime-silica glass including as essential ingredients from about 0.54 to about 0.65 weight percent $Fe_2O_3$, from about 0.18 to about 0.22 weight percent FeO, and from about 0.55 to about 1.2 weight percent $CeO_2$, wherein said weight percent FeO represents a percent reduction of total iron, expressed as $Fe_2O_3$, of from about 23% to about 29%, said glass at a nominal thickness of 4 mm having an Illuminant A visible light transmittance greater than 70%, a total solar energy transmittance less than about 46%, an ultraviolet radiation transmittance less than about 36%, an Illuminant C dominant wavelength of from about 498 to about 525 nanometers, and a color purity of from about 2% to about 4%.

8. A green-colored soda-lime-silica glass as defined in claim 7, wherein the Illuminant C dominant wavelength is from about 498 to about 519 nonometers, the color purity is from about 2% to about 3%, and the ultraviolet radiation transmittance is not greater than approximately 34%.

9. A green-colored, infrared energy and ultraviolet radiation absorbing soda-lime-silica glass including as essential ingredients from about 0.71 to about 0.95 weight percent $Fe_2O_3$, from about 0.26 to about 0.32 weight percent FeO, and from about 0.8 to about 1.4 weight percent $CeO_2$, wherein said weight percent FeO represents a percent reduction of total iron, expressed as $Fe_2O_3$, of from about 23% to about 29%, said glass at a nominal thickness of 3 mm having an Illuminant A visible light transmittance greater than 70%, a total solar energy transmittance less than about 46%, an ultraviolet radiation transmittance less than about 36%, an Illuminant C dominant wavelength of from about 498 to about 525 nanometers, and a color purity of from about 2% to about 4%.

10. A green-colored soda-lime-silica glass as defined in claim 9, wherein the Illuminant C dominant wavelength is from about 498 to about 519 nanometers, the color purity is from about 2% to about 3%, and the ultraviolet radiation transmittance is not greater than approximately 34%.

11. A green-colored, infrared energy and ultraviolet radiation absorbing soda-lime-silica glass including as essential ingredients from about 0.51 to about 0.59 weight percent $Fe_2O_3$, from about 0.14 to about 0.17 weight percent FeO, and from about 0.2 to about 0.7 weight percent $CeO_2$, wherein said weight percent FeO represents a percent reduction of total iron, expressed as $Fe_2O_3$, of from about 23% to about 29%, said glass at a nominal thickness of 5 mm having an Illuminant A visible light transmittance greater than 70%, a total solar energy transmittance less than about 46%, an ultraviolet radiation transmittance less than about 36%, an Illuminant C dominant wavelength of from about 498 to about 525 nanometers, and a color purity of from about 2% to about 4%.

12. A green-colored soda-lime-silica glass as defined in claim 11, wherein the Illuminant C dominant wavelength is from about 498 to about 519 nanometers, the color purity is from about 2% to about 3%, and the ultraviolet radiation transmittance is not greater than approximately 34%.

13. A green-colored, infrared energy and ultraviolet radiation absorbing glass composition, comprising:
(A) from about 65 to about 75 weight percent $SiO_2$;
(B) from about 10 to about 15 weight percent $Na_2O$;
(C) from 0 to about 4 weight percent $K_2O$;
(D) from about 1 to about 5 weight percent MgO;
(E) from about 5 to about 15 weight percent CaO;
(F) from 0 to about 3 weight percent $Al_2O_3$;
(G) from about 0.53 to about 0.96 weight percent $Fe_2O_3$;
(H) from about 0.15 to about 0.33 weight percent FeO; and
(I) from about 0.2 to about 1.4 weight percent $CeO_2$;
wherein said weight percent FeO represents a percent reduction of total iron, expressed as $Fe_2O_3$, of from about 23% to about 29%, said glass at thicknesses in the range of 3 mm to 5 mm having an Illuminant A visible light transmittance greater than 70%, a total solar energy transmittance less than about 46%, an ultraviolet radiation transmittance less than about 38%, an Illuminant C dominant wavelength from about 498 to about 525 nanometers, and a color purity from about 2% to about 4%.

14. A green-colored, infrared energy and ultraviolet radiation absorbing glass composition, consisting essentially of:
(A) from about 70 to about 73 weight percent $SiO_2$;
(B) from about 12 to about 14 weight percent $Na_2O$;
(C) from 0 to about 1 weight percent $K_2O$;
(D) from about 3 to about 4 weight percent MgO;
(E) from about 6 to about 10 weight percent CaO;
(F) from 0 to about 2 weight percent $Al_2O_3$;
(G) from about 0.53 to about 0.96 weight percent $Fe_2O_3$;
(H) from about 0.15 to about 0.33 weight percent FeO; and
(I) from about 0.2 to about 1.4 weight percent $CeO_2$;
wherein said weight percent FeO represents a percent reduction of total iron, expressed as $Fe_2O_3$, of from about 23% to about 29%, said glass at thicknesses in the range of 3 mm to 5 mm having an Illuminant A visible light transmittance greater than 70%, a total solar energy transmittance less than about 46%, an ultraviolet radiation transmittance less than about 38%, an Illuminant C dominant wavelength from about 498 to about 525 nanometers, and a color purity from about 2% to about 4%.

15. A green-colored, infrared energy and ultraviolet radiation absorbing soda-lime-silica glass including as essential ingredients from about 0.51 to about 0.62 weight percent $Fe_2O_3$, from about 0.18 to about 0.22 weight percent FeO, and from about 0.3 to about 0.75 weight percent $CeO_2$, and about 0.02 to about 0.45 weight percent $TiO_2$, wherein said weight percent FeO represents a percent reduction of total iron, expressed as $Fe_2O_3$, of from about 23% to about 29%, said glass at a nominal thickness of 4 mm having an Illuminant A visible light transmittance greater than 70%, a total solar energy transmittance less than about 46%, an ultraviolet radiation transmittance less than about 36%, an Illuminant C dominant wavelength from about 498 to about 525 nanometers, and a color purity from about 2% to about 4%.

16. A green-colored, infrared energy and ultraviolet radiation absorbing soda-lime-silica glass including as essential ingredients from about 0.48 to about 0.56 weight percent $Fe_2O_3$, from about 0.14 to about 0.17 weight percent FeO, from about 0.1 to about 0.4 weight percent $CeO_2$, and about 0.02 to about 0.35 weight percent $TiO_2$, wherein said weight percent FeO represents a percent reduction of total iron, expressed as $Fe_2O_3$, of from about 23% to about 29%, said glass at a nominal thickness of 5 mm having an Illuminant A visible light transmittance greater than 70%, a total solar energy transmittance less than about 46%, an ultraviolet radiation transmittance less than about 36%, an Illuminant C dominant wavelength from about 498 to about 525 nanometers, and a color purity from about 2% to about 4%.

17. A green-colored, infrared energy and ultraviolet radiation absorbing soda-lime-silica glass including as essential ingredients from about 0.68 to about 0.92 weight percent $Fe_2O_3$, from about 0.26 to about 0.32 weight percent FeO, and from about 0.5 to about 1.2 weight percent $CeO_2$, and about 0.02 to about 0.85 weight percent $TiO_2$, wherein said weight percent FeO represents a percent reduction of total iron, expressed as $Fe_2O_3$, of from about 23% to about 29%, said glass at a nominal thickness of 3 mm having an Illuminant A visible light transmittance greater than 70%, a total solar energy transmittance less than about 46%, an ultraviolet radiation transmittance less than about 36%, an Illuminant C dominant wavelength from about 498 to about 525 nanometers, and a color purity from about 2% to about 4%.

18. A green-colored, infrared energy and ultraviolet radiation absorbing glass composition, comprising;
 (A) from about 65 to about 75 weight percent $SiO_2$;
 (B) from about 10 to about 15 weight percent $Na_2O$;
 (C) from 0 to about 4 weight percent $K_2O$;
 (D) from about 1 to about 5 weight percent MgO;
 (E) from about 5 to about 15 weight percent CaO;
 (F) from 0 to about 3 weight percent $Al_2O_3$;
 (G) from about 0.5 to about 0.9 weight percent $Fe_2O_3$;
 (H) from about 0.15 to about 0.33 weight percent FeO;
 (I) from about 0.1 to about 1.36 weight percent $CeO_2$; and
 (J) from about 0.02 to about 0.85 weight percent $TiO_2$; wherein said weight percent FeO represents a percent reduction of total iron, expressed as $Fe_2O_3$, of from about 23% to about 29%, said glass at thicknesses in the range of 3 mm to 5 mm having an Illuminant A visible light transmittance greater than 70%, a total solar energy transmittance less than about 46%, an ultraviolet radiation transmittance less than about 38%, an Illuminant C dominant wavelength from about 498 to about 525 nanometers, and a color purity from about 2% to about 4%.

19. A green-colored, infrared energy and ultraviolet radiation absorbing glass composition, consisting essentially of;
 (A) from about 70 to about 73 weight percent $SiO_2$;
 (B) from about 12 to about 14 weight percent $Na_2O$;
 (C) from 0 to about 1 weight percent $K_2O$;
 (D) from about 3 to about 4 weight percent MgO;
 (E) from about 6 to about 10 weight percent CaO;
 (F) from 0 to about 2 weight percent $Al_2O_3$;
 (G) from about 0.5 to about 0.9 weight percent $Fe_2O_3$;
 (H) from about 0.15 to about 0.33 weight percent FeO;
 (I) from about 0.1 to about 1.36 weight percent $CeO_2$; and
 (J) from about 0.02 to about 0.85 weight percent $TiO_2$; wherein said weight percent FeO represents a percent reduction of total iron, expressed as $Fe_2O_3$, of from about 23% to about 29%, said glass at thicknesses in the range of 3 mm to 5 mm having an Illuminant A visible light transmittance greater than 70%, a total solar energy transmittance less than about 46%, an ultraviolet radiation transmittance less than about 38%, an Illuminant C dominant wavelength from about 498 to about 525 nanometers, and a color purity from about 2% to about 4%.

20. An automotic glazing, comprising a green-colored soda-lime-silica glass containing a total iron concentration above about 0.7 weight percent, ceric oxide, and optionally titanium dioxide, said glazing at a thickness in the range of 3 mm to 5 mm having an Illuminant A visible light transmittance greater than 70%, a total solar energy tranmittance less than about 46%, an ultraviolet radiation transmittance less than about 36%, an Illuminant C dominant wavelength from about 498 to about 519 nanometers, and a color purity of from about 2% to about 3%.

21. The automotic glazing according to claim 20, wherein said glass is a tempered or heat strengthened float glass sheet.

22. An automotive glazing unit, comprising two sheets of a green-colored, infrared energy and ultraviolet radiation absorbing soda-lime-silica glass integrally adhered together through an interposed layer of transparent resinous material, said glass including as essential ingredients from about 0.51 to about 0.96 weight percent $Fe_2O_3$, from about 0.15 to about 0.33 weight percent FeO, and from about 0.2 to about 1.4 weight percent $CeO_2$, wherein said weight percent FeO represents a percent reduction of total iron, expressed as $Fe_2O_3$, of from about 23% to about 29%, said glazing unit having an Illuminant A visible light transmittance greater than 70%, a total solar energy transmittance less than about 46%, an ultraviolet radiation transmittance less than about 34%, an Illuminant C dominant wavelength from about 498 to about 525 nanometers, and a color purity from about 2% to about 4%.

23. An automotive glazing unit according to claim 22, wherein each of said glass sheets has a thickness in the range of from about 1.7 mm to 2.5 mm.

24. An automotive glazing unit according to claim 23, wherein said transparent resinous material is polyvinyl butyral.

25. An automotive glazing unit according to claim 24, wherein said polyvinyl butyral layer is about 0.30 inch in thickness.

26. An automotive glazing unit, comprising two sheets of a green-colored, infrared energy and ultraviolet radiation absorbing soda-lime-silica glass integrally adhered together through an interposed layer of transparent resinous material, said glass including as essential ingredients from about 0.5 to about 0.9 weight percent $Fe_2O_3$, from about 0.15 to about 0.33 weight percent FeO, from about 0.1 to about 1.36 weight percent $CeO_2$, wherein said weight percent FeO represents a percent reduction of total iron, expressed as $Fe_2O_3$, of from about 23% to about 29%, said glazing unit having an Illuminant A visible light transmittance greater than 70%, a total solar energy transmittance less than about 46%, an ultraviolet radiation transmittance less than about 34%, an Illuminant C dominant wavelength from about 498 to about 525 nanometers, and a color purity from about 2% to about 4%.

27. An automotive glazing unit according to claim 26, wherein each of said glass sheets has a thickness in the range of from about 1.7 to 2.5 mm.

28. An automotive glazing unit according to claim 27, wherein said transparent resinous material is polyvinyl butyral.

29. An automotive glazing unit according to claim 28, wherein said polyvinyl butyral layer is about 0.30 inch in thickness.

30. A green-colored, infrared energy and ultraviolet radiation absorbing soda-lime-silica glass produced by vitrifying a batch composition having a total iron concentration above about 0.7 weight percent, said glass including as essential ingredients from about 0.51 to about 0.96 weight percent $Fe_2O_3$, from about 0.15 to about 0.33 weight percent FeO, and from about 0.2 to about 1.4 weight percent $CeO_2$, said weight percent FeO represents a percent reduction of total iron in the batch of from about 23% to about 29%, said glass having an Illuminant C dominant wavelength of from about 498 to about 525 nanometers, and a color purity of from about 2% to about 4%.

31. A green-colored glass as defined in claim 30, wherein said glass at a thickness in the range of from about 3 mm to about 5 mm, has an Illuminant A visible light transmittance greater than 70%, a total solar energy transmittance less than about 46%, an ultraviolet radiation transmittance not greater than approximately 34%, an Illuminant C dominant wavelength of from about 498 to 519 nanometers, and a color purity of from about 2% to about 3%.

32. A green-colored, infrared energy and ultraviolet radiation absorbing soda-lime-silica glass produced by vitrifying a batch composition having a total iron concentration above about 0.7 weight percent, said glass including as essential ingredients from about 0.48 to about 0.92 weight percent $Fe_2O_3$, from about 0.15 to about 0.33 weight percent FeO, from about 0.1 to about 1.3 weight percent $CeO_2$, and from about 0.02 to about 0.85 weight percent $TiO_2$, said weight percent FeO representing a percent reduction of total iron in the batch of from about 23% to about 29%, said glass having an Illuminant C dominant wavelength of from about 498 to about 525 nanometers, and a color purity of from about 2% to about 4%.

33. A green-colored glass as defined in claim 32, wherein said glass at a thickness in the range of from about 3 mm to about 5 mm, has an Illuminant A visible light transmittance greater than 70%, a total solar energy transmittance less than about 46%, an ultraviolet radiation transmittance not greater than approximately 34%, an Illuminant C dominant wavelength of from about 498 to 519 nanometers, and a color purity of from about 2% to about 3%.

* * * * *

UNITED STATES PATENT AND TRADEMARK OFFICE
CERTIFICATE OF CORRECTION

PATENT NO. : 5,077,133

DATED : December 31, 1991

INVENTOR(S) : J. Joseph Cheng

It is certified that error appears in the above-identified patent and that said Letters Patent is hereby corrected as shown below:

Column 2, line 22, "No. 2.860,059" should read --No. 2,860,059--.

Column 3, line 54, "0.7%." should read --0.7%**--; lines 57, 58 and 59 should appear as part of the footnote designated by the star (*) after "discovered" on line 39;

Column 3, lines 59 (beginning after ) to 68 and continuing in Column 4, lines 1 to 9, are all part of the footnote designated by the double star ().

Column 4, lines 59 and 60, after "interior" insert --plastic components in order to prevent their degradation.--.

Column 5, line 40, "0 53" should read --0.53--.

Col. 9, line 48, "0.09%" should read --.009%--.

Col. 9, line 61, "Ö30" should read --.030--.

Column 10:
    claim 4, line 27, delete "and";
    claim 6, line 45, "is than" should read --is less than--, line 46, "less than about" should read --not greater than approximately--;
    claim 8, line 65, "nonometers" should read --nanometers--.

Column 13:
    claim 20, line 60, "automotic" should read --automotive--;
    line 66, "tranmittance" should read --transmittance--.

UNITED STATES PATENT AND TRADEMARK OFFICE
CERTIFICATE OF CORRECTION

PATENT NO. : 5,077,133
DATED : December 31, 1991
INVENTOR(S) : J. Joseph Cheng

It is certified that error appears in the above-indentified patent and that said Letters Patent is hereby corrected as shown below:

Column 14:
    claim 21, line 3, "automotic" should read --automotive--;
    claim 26, line 39, after "$CeO_2$," insert --and from about 0.02 to about 0.85 weight percent $TiO_2$,--;
    claim 30, line 66, "represents" should read --representing--.

Signed and Sealed this

Seventh Day of September, 1993

BRUCE LEHMAN

*Attesting Officer*       *Commissioner of Patents and Trademarks*